United States Patent
Tholl et al.

[11] Patent Number: 6,122,108
[45] Date of Patent: Sep. 19, 2000

[54] MICRO-OPTICAL BEAM DEFLECTION SYSTEM

[75] Inventors: Hans D. Tholl, Uberlingen; Michael Gross, Überlingen; Steffen Glöckner, Jena; Rolf Göring, Jena; Peter Schreiber, Jena, all of Germany

[73] Assignee: Bodenseewerk Geratetechnik GmbH, Uberlingen, Germany

[21] Appl. No.: 09/185,517

[22] Filed: Nov. 4, 1998

[30] Foreign Application Priority Data

Nov. 11, 1997 [DE] Germany .............. 197 49 799

[51] Int. Cl.[7] .................................................. G02B 27/10

[52] U.S. Cl. .................... 359/619; 359/621; 359/627

[58] Field of Search .................................. 359/621, 619, 359/622, 623, 624, 625, 626

[56] References Cited

U.S. PATENT DOCUMENTS

| | | | |
|---|---|---|---|
| 5,059,008 | 10/1991 | Flood et al. | 359/196 |
| 5,444,572 | 8/1995 | Gal et al. | 359/619 |
| 5,448,395 | 9/1995 | Lopez et al. | 359/224 |
| 5,463,498 | 10/1998 | Gal et al. | 359/622 |
| 5,477,383 | 12/1995 | Jain | 359/565 |
| 5,519,206 | 5/1996 | Uwira | 250/208.1 |
| 5,581,408 | 12/1996 | Schumtz et al. | 359/622 |
| 5,812,322 | 9/1998 | Meyers | 359/621 |

*Primary Examiner*—Georgia Epps
*Assistant Examiner*—Saeed Seyrafi
*Attorney, Agent, or Firm*—McDermott, Will & Emery

[57] ABSTRACT

A micro-optical beam deflection system, operable to be moved between discrete states with a pair of micro-optical lens grids arranged behind each other in the path of rays, and which can be mutually displaced transverse to the direction of beams, in which the lens grids are arranged substantially in the image plane of an intermediate image.

6 Claims, 3 Drawing Sheets

MICRO-OPTICAL BEAM DEFLECTION SYSTEM

FIELD OF THE INVENTION

The invention relates to a micro-optical beam deflection system, operable to be moved between discrete states comprising a pair of micro-optical lens grids, which are arranged behind each other in the path of rays, and which can be mutually displaced transverse to the direction of beams.

BACKGROUND OF THE INVENTION

A micro-optic beam deflection system is disclosed in U.S. Pat. No. 5,444,572 A. Here, the "sight direction" is altered by lateral displacement of the lens grids. In this arrangement, the pair of lens grids are positioned in an aperture plane of an imaging path of rays. Parallel light beams are incident on the lens grids. Each object point simultaneously illuminates many lenses of the lens grid. Because the lenses of the lens grid are periodically arranged, modulation of the wavefronts is effected. Grating orders occur. This causes considerable chromatic errors. Therefore, this arrangement does not fulfil the requirements demanded from a high-resolution system.

Furthermore, mirror arrays are known consisting of a multitude of micro-mechanically produced, tiltable mirror elements, which are digitally controllable by electric control signals. By tilting the mirrors, rays incident on the mirror array can be guided either to enter a detection channel of a detector array or to by-pass it. U.S. Pat. No. 5,519,206 describes an arrangement in which an intermediate image of an object scene is generated in the plane of the mirror array by a wide angle objective. The pixel number of the mirror array is considerably larger than the pixel number of the detector array, i.e. a two-dimensional arrangement of detector elements. Therefore, a plurality of pixels or mirror elements of the mirror array are imaged on each detector element of the detector array by means of a second imaging objective. Now, if only one of the mirror elements of each sub-matrix is switched to a position in which it directs an incident light beam onto the second imaging objective while all the other detector elements of the sub-matrices direct their light beams to by-pass the second imaging objective, then a full image with higher resolution can be obtained by successively switching the mirror elements and storing the images after a cycle.

Such a mirror arrangement requires a folding of the path of rays. Each individual mirror element is controlled. Therefore such mirror arrays are quite expensive.

SUMMARY OF THE INVENTION

It is an object of the invention to design a micro-optical beam deflection system, operable to be moved between discrete states, which is simple and compact and simply controllable with available actuators, requires short actuator travel and, therefore, short change-over times but at the same time is suitable for high resolution systems.

This object is achieved by a micro-optical beam deflection system, operable to be moved between discrete states, of the type mentioned in the beginning, the lens grids being arranged substantially in the image plane of an intermediate image.

Thereby, beam deflection system requires only two micro-optical rigid lens grids of which one is displaceable with respect to the other as a whole by means of one or several actuators. Therefore, the arrangement is very simple as compared with the individually pivotally mounted and controllable mirrors of the mirror arrays. The deflection of the beams is effected in through-passage without folding the path of rays. In contrast to the known beam deflection system of U.S. Pat. No. 5,444,572, the lens grids are located not in an aperture plane but at the position of the intermediate image. Thereby, grating orders do not occur. Each intermediate image point is only transmitted from a single pair of lenses of the two lens grids.

BRIEF DESCRIPTION OF THE DRAWING

An embodiment of the invention is described in detail hereinafter with reference to the accompanying drawings.

DETAILED DESCRIPTION OF THE INVENTION

Figure 1:
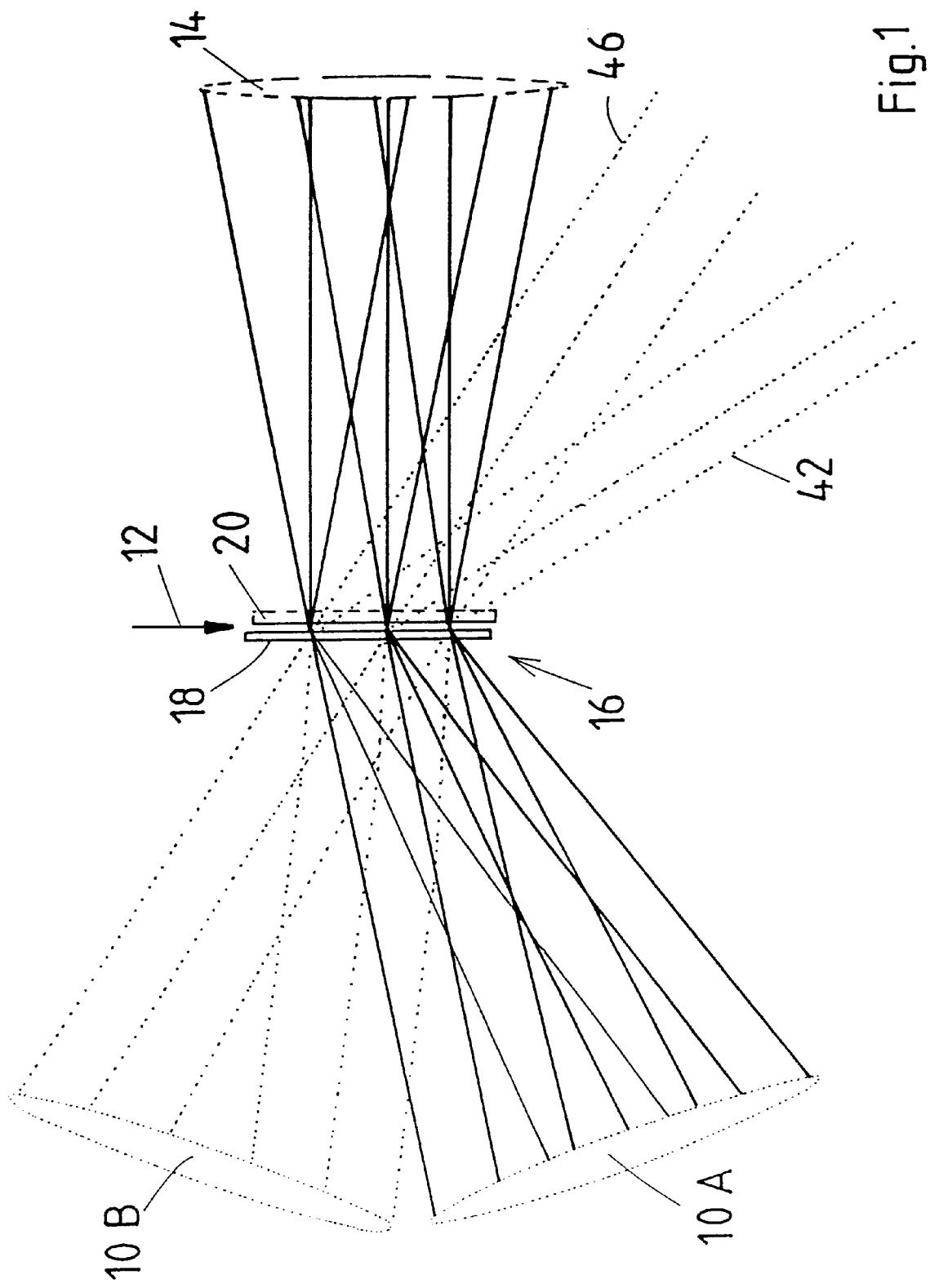
FIG. 1 is a schematic illustration and shows a first imaging objective which generates an intermediate image, a beam deflection system in the plane of the intermediate image and a second imaging objective which further images the intermediate image on a matrix detector, for example.

Numerals 10A and 10B designate two first imaging objectives in FIG. 1. The imaging objective 10A generates an intermediate image of a first partial object field in an image plane 12. A second intermediate image of a second partial object field is generated by the imaging objective 10B in the image plane 12. The second intermediate image is superimposed on the first intermediate image in the plane 12. A second imaging objective 14 images the intermediate image on a matrix detector, for example. The schematically illustrated first and second imaging objectives each have a telecentric path of rays on the side of the intermediate image as indicated by the imaging light beam. Thereby, the center rays of each individual imaging light beam which generates an image point of the intermediate image or images this image point are merely mutually parallel displaced. A defined angle is allocated to each of the first imaging objectives 10A and 10B at which angle the imaging light beam for the various image points intersect the plane 12. Correspondingly, the second imaging objective 14 detects only imaging light beams having center rays at a certain angle, for example, normal to the plane 12.

Figure 3:
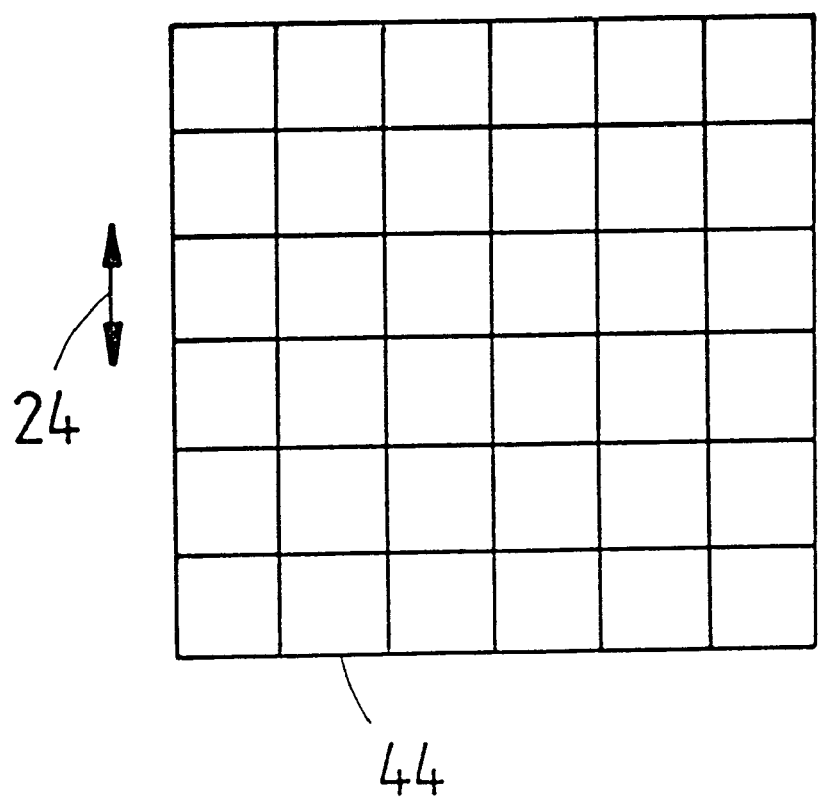
FIG. 3 is a schematic illustration and shows a front view of a micro-optical beam deflection system.

A micro-optical beam deflector 16 is located in the image plane 12. The micro-optical beam deflector consists of two micro-optical lens grids 18 and 20. The two lens grids 18 and 20 are displaceable relative to each other parallel to their planes in two mutually orthogonal directions by actuators (not illustrated). This is indicated in FIG. 3 by double arrows 22 and 24.

Figure 2:
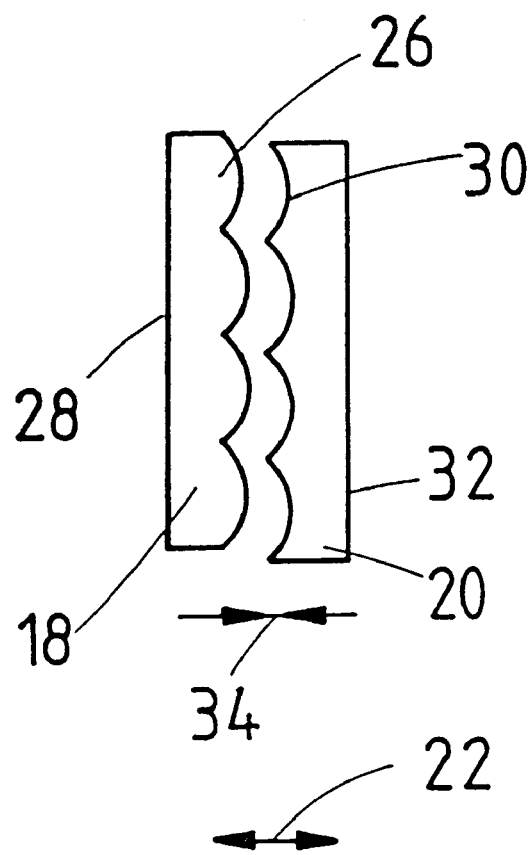
FIG. 2 is a schematic illustration and shows a section through a micro-optical beam deflection system.

As can be seen from FIG. 2, the micro-optical lens grid 18 consists of a grid of focusing lenses 26 with a plane front surface 28. The micro-optical lens grid 20 consists of a grid of dispersing lenses 30, wherein the concave surfaces of the dispersing lenses 30 are facing the convex surfaces of the focusing lenses 26 and the lens grid 20 is provided with a plane rear surface 32. An air gap is formed between the micro-optical lens grids 18 and 20 and permits relative lateral displacement of the two lens grids 18 and 20.

Figure 4:
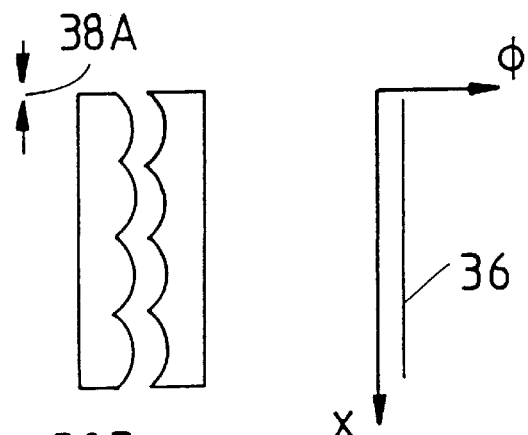
FIGS. 4 to 7 show the micro-optical beam deflection system in various relative positions of the two lens grids and the associated phases of the light waves entering through the beam deflection system.
Figure 5:
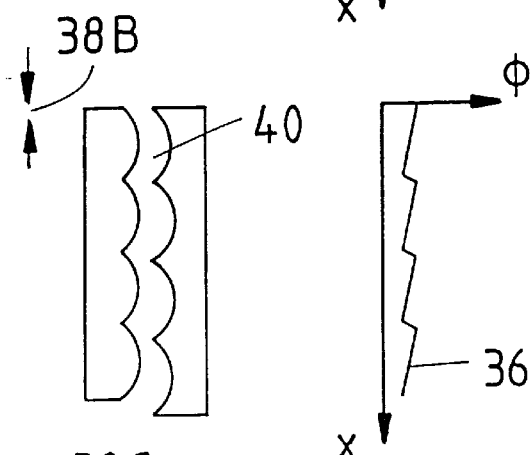
Figure 6:
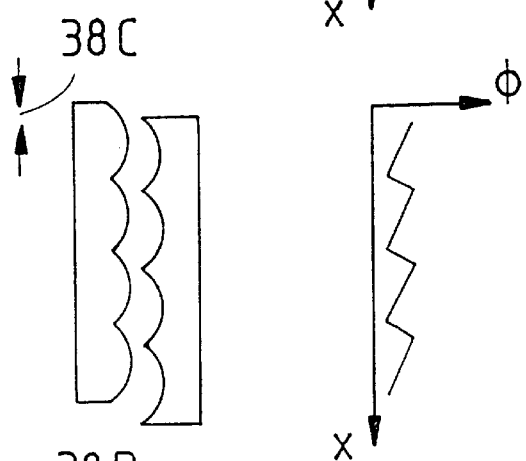
Figure 7:
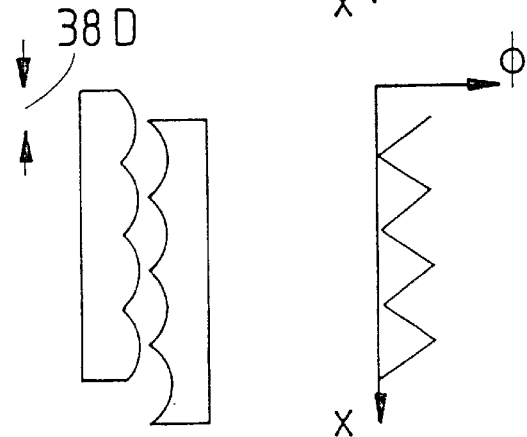

As can be seen from FIGS. 4 to 7, a relative displacement of the two micro-optical lens grids and thereby relative displacement of each pair of focusing and dispersing lenses 26 and 30, respectively, causes tilting of the phase planes 36 of the light beam passing through the respective pair and thereby deflection. In FIG. 4, the optical axis of each pair of the focusing and dispersing lenses 26 and 30, respectively, coincide. The relative displacement 38A of the micro-optical lens grid is zero. In this case, both lens grids 18 and 20 act like a plane-parallel plate. The phase planes 36 are parallel to the plane surfaces 28 and 32 of the lens grids 18 and 20, respectively. When the lens grids 18 and 20 are displaced by a distance designated by 38B, the focusing and dispersing lenses 26 and 30 of each pair are mutually laterally displaced. The air gap 40 between the two lenses acts like a wedge: In the region of the upper portion of the air gap 40 in FIG. 5, the lightwaves pass through a greater distance of the material of the lens grids (n>1) and a smaller distance in the air than in the lower portion. Consequently, the phase leads in the opper portion, as illustrated, which corresponds to a deflection of the light beams passing through this pair of focusing and dispersing lenses. The greater the lateral relative displacement 38C or 38D of the lens grids 18 and 20 is, the more pronounced this effect becomes, as illustrated in FIGS. 6 and 7.

There will be deflection of the light beams which generate the individual image points. This deflection occurs in the image plane. Only one image point or small image region is allocated to each micro-optical lens.

In the state illustrated in FIG. 1, the center rays of the imaging light beams of the intermediate image of the partial object field covered by the first imaging objective 10A, as generated by the first imaging objective 10A, are substantially normal to the image plane of the second imaging objective 14, after the deflection. Due to the object-side telecentric path of rays of the second image object 14,only these imaging light beams are covered or received by the second imaging objective 14. Only the partial object field covered by the first imaging objective 10A is imaged by the second imaging objective 14 on an image resolution matrix detector, for example, with a two-dimensional arrangement of detector elements. The further first imaging objective 10B also generates an intermediate image of a partial object field covered by the imaging objective 10B in the image plane 12 and superimposes it on the intermediate image generated by the imaging objective 10A. The rays 42 of the imaging light beams of the imaging objective 10B form an angle with the plane of the lens grids 18 and 20, in the illustrated position of the micro-optical beam deflection system 16, such that this imaging light beam is not received by the second objective 14. This is illustrated in FIG. 1 in broken lines.

The two lens grids 18 and 20 can now be set to different relative positions each corresponding to a defined deflection angle by means of an actuator, as illustrated in FIG. 3 by a double arrow 24. The positions and deflection angles can then be chosen such that the respective deflected imaging light beams from one of the first imaging objectives 10A or 10B can be guided to the second imaging objective 14, i.e. normal to the plane of the lens grids 18 and 20, for example. This can be achieved by small relative displacements of the lens grids 18 and 20. Conventional piezo-actuators can be used as actuators. This enables a very fast change-over between the different partial object fields.

In an embodiment of the micro-optical beam deflection system, operable to be moved between discrete states, the system operates in the infrared spectral range with wavelengths between 3 $\mu$m and 5 $\mu$m. Focusing and dispersing lenses 26 and 30 have approximately the same focal lengths. The distance 34 is smaller than the axial extent of the point images (depth of field). Thus, the two lenses 18 and 20 act in combination like a thin phase plate. Due to the exact choice of the focal lengths and the distance 34, the divergence of the light beam leaving the beam deflection system 16 can be influenced. Thereby, this divergence can be adapted to the parameters of the second imaging objective 14. When the two lens grids 18 and 20 are relatively laterally displaced by a few micrometers from the original position in FIG. 4, the imaging light beams of the imaging objective 10A are deflected such that they are telecentrically received by the imaging objective 14 and guided onto a matrix detector as illustrated in FIG. 1. The imaging light beam of the imaging objective 10B miss the imaging objective 14. Correspondingly, the imaging light beam 46 of the imaging objective 10B can be deflected onto the second imaging objective 14 by a relative displacement of the lens grids 18 and 20 in the opposite direction.

We claim:

1. A micro-optical beam deflection system arranged in a path of rays of an imaging optical system and operable to be moved between discrete states, comprising a pair of micro-optical lens grids, which are arranged behind each other in the path of rays, and which can be mutually displaced transverse to the direction of beams in said path of rays, wherein said lens grids are substantially arranged in an image plane of an intermediate image of said imaging optical system.

2. A micro-optical beam deflection system as claimed in claim 1, wherein said lens grids comprise one grid with focusing lenses and one grid with dispersing lenses.

3. A micro-optical beam deflection system as claimed in claim 1, wherein said imaging optical system comprises a first imaging objective and a second imaging objective, said intermediate image of an associated object field being generated on said micro-optical lens grids by said first imaging objective, and said intermediate image being further imaged by said second imaging objective, said second imaging objective receiving imaging rays from a limited angular range.

4. A micro-optical beam deflection system, as claimed in claim 3, wherein said first imaging objective is arranged to generate said intermediate image in an image-side telecentric path of rays.

5. A micro-optical beam deflection system as claimed in claim 4, wherein said second imaging objective is arranged to further image said intermediate image in an object-side telecentric path of rays.

6. A micro-optical beam deflection system as claimed in claim 4, wherein (a) said imaging optical system comprises a plurality of first imaging objectives, each of said first imaging objectives being arranged to generate an intermediate images of an associated portion of a field of view by an imaging path of rays, said intermediate images being superimposed in said image plane, said imaging paths of rays of said plurality of first imaging objectives forming different angles with the micro-optical lens grids, and (b) means are provided for relatively displacing said lens grids to optionally direct the path of rays of a respective one of said first imaging objectives into the angular range covered by said second imaging objective.

* * * * *